United States Patent
Loscher et al.

(10) Patent No.: US 6,173,903 B1
(45) Date of Patent: Jan. 16, 2001

(54) PROCEDURE FOR REGULATING THE TEMPERATURE OF A MATERIAL TO BE PROCESSED IN A PROCESSING CHAMBER AND DEVICE TO ACCOMPLISH THIS

(75) Inventors: Helmut Loscher, Nidderau; Hubert Heeg, Mömbris, both of (DE)

(73) Assignee: Kendro Laboratory Products GmbH, Hanau (DE)

(*) Notice: Under 35 U.S.C. 154(b), the term of this patent shall be extended for 0 days.

(21) Appl. No.: 09/215,705

(22) Filed: Dec. 18, 1998

(30) Foreign Application Priority Data

Dec. 19, 1997 (DE) .............................. 197 56 510

(51) Int. Cl.[7] .............................. G05D 15/00; G01K 3/00
(52) U.S. Cl. .............................. 236/78; 219/508; 374/110
(58) Field of Search .............................. 236/78 B; 219/508; 374/110; 62/208

(56) References Cited

U.S. PATENT DOCUMENTS

| | | | |
|---|---|---|---|
| 4,320,285 | 3/1982 | Koether | 219/497 |
| 4,336,329 * | 6/1982 | Hesse et al. | 435/3 |
| 4,337,516 * | 6/1982 | Murphy et al. | 364/551 |
| 4,586,149 | 4/1986 | Stillman et al. | 364/557 |
| 4,692,598 | 9/1987 | Yoshida et al. | 219/497 |
| 4,797,776 * | 1/1989 | Snyder | 236/78 B |
| 5,350,900 | 9/1994 | Inage et al. | 219/508 |

FOREIGN PATENT DOCUMENTS

| | | |
|---|---|---|
| 21 33119 B2 * | 1/1972 | (DE) . |
| 31 00273 A1 | 1/1981 | (DE) . |
| 82 29 723 U * | 10/1982 | (DE) . |
| 31 45333 C2 * | 5/1983 | (DE) . |
| 0 004 035 A1 | 3/1979 | (EP) . |
| 2 045 978 | 3/1979 | (GB) . |

OTHER PUBLICATIONS

Computer Control of Industrial Processes, Savas pp. 12 & 13, McGraw–Hill, Mar. 21, 1966, TJ 213 53 C.2.*
Patent abstract of Japan, vol. 15, No. 169, Apr. 26, 1991, app. No. JP 03 034006 A, Kyocera Corp., Feb. 14, 1991.
Patent abstract of Japan, vol. 9, No. 285, Nov. 12, 1985, app. No. JP 60 126702A, Taniguchi Kazumi et al.

* cited by examiner

*Primary Examiner*—William Wayner
(74) *Attorney, Agent, or Firm*—Workman, Nydegger & Seeley (57) ABSTRACT

To regulate the temperature in the processing chamber of an incubator with a fault protection function, two temperature sensors are provided to measure actual temperatures or rather sensor signals, and they and their associated peripherals undergo a plausibility check during which the sensor signals may not exceed a specified difference. if the plausibility condition is met and if an error in the feedback control circuit, for example a permanently closed contact of the temperature stabilization actuator, should cause the temperature sensor signal value (actual value) to exceed or fall below a specified error tolerance band about a desired value, then control is transferred from a first feedback control circuit to a primary feedback control circuit with a controller/monitoring device.

24 Claims, 4 Drawing Sheets

PROCEDURE FOR REGULATING THE TEMPERATURE OF A MATERIAL TO BE PROCESSED IN A PROCESSING CHAMBER AND DEVICE TO ACCOMPLISH THIS

This application claims priority under 35 U.S.C. § 119 to German patent application Serial No. 197 56 510.7, filed Dec. 19, 1997, which application is incorporated herein by specific reference.

BACKGROUND OF THE INVENTION

1. The Field of the Invention

This invention concerns systems and procedures for controlling the temperature of a material to be processed in the atmosphere of a processing chamber which is closed to the surrounding atmosphere, by comparing a desired temperature with the actual temperature in a first and a second control circuit. The actual temperatures are determined by at least two independent temperature sensors in the processing chamber. The temperatures undergo a plausibility test with a specified threshold difference value. Non-fulfillment of the plausibility condition causes a signal to be output and the energy supply for stabilizing the temperature of the processing chamber to be interrupted.

2. Present State of the Art

DE 31 00 273 A1 discloses a failure- and drift-proof temperature regulator in which two sensors determine the actual temperature in the processing chamber of an oven. A comparator then performs a plausibility check, according to which the difference between the two temperature signals must lie within a specified tolerance range for them to be plausible. As a prerequisite, it is assumed that it is extremely unlikely for an error of equal magnitude to occur in two temperature regulators or sensors simultaneously.

This reference also discloses the use of a logic system which tests at least two thermometers and which, if the temperature deviation is too great, not only outputs a warning signal but passes control of the temperature in a processing chamber from a first controller to a second controller. Here, the test characteristics are, e.g., the difference between the expected value and the actual value, the feed current of the instrument, the position of the limit switch in the instruments, and the duration of absence of a new command to change the control variable. Furthermore, the comparator can be blocked during a heating or cooling phase of the heat treatment system.

A temperature control device is also know from DE 82 29 723 U1 with a first thermostatic switch controlled by a first temperature-sensitive element, and a second thermostatic switch controlled by a second temperature-sensitive element. The second temperature-sensitive element can turn on the second thermostatic switch at a certain limit temperature outside the operating temperature range. The second thermostatic switch is arranged next to the first one and has a manual reset component. A display element arranged next thereto indicates its control state. Such a control device, when used on a freezer, is intended to display a warning if the normal control cycle within the operating temperature range has been disturbed, such as, e.g., during a longer power failure.

Here it turns out to be a problem that even when the plausibility condition of the temperature sensors is met, additional defects in the control circuit can occur. Such as, for example, false triggering of actuators. This, for example, can cause a contact to remain permanently closed.

An incubator is also know from DE 21 33 119 B2 which uses water as a circulating fluid and which uses temperature regulation to keep the water at a constant temperature level, such as 37° C., for example. It turns out to be a problem if an error occurs in the heating system. This makes it possible for the material in the useful space, for example cell cultures, to be endangered by overheating, for example. This also goes for falling below the specified temperatures when the heating completely fails. It is also possible for individual elements of the feedback control circuit to fail, for example, the temperature sensor. This can cause an uncontrolled situation which can destroy cell cultures.

OBJECTS AND BRIEF SUMMARY OF THE INVENTION

The task of the present invention is to protect the material being processed—especially cell cultures—against destruction by overheating or overcooling due to defects or component drift in feedback control circuit system. This can be caused by drift in temperature sensors or defective actuators. It should also make it possible to summon quick help from an operator if a system error should occur.

The task is solved, in the procedure according to the invention, by passing control from a first control circuit to a second control circuit when plausibility conditions are not met. The plausibility conditions are not met because the temperature rises above or falls below an adjustable tolerance band about a specified desired value (W1). The second control circuit includes a controller/monitoring device and an actuator.

It turns out to be advantageous if the complete control circuit, together with its sensor and actuator, is also monitored by a monitoring device. As a result, it is no longer possible for an error in the feedback control circuit or sensor system to destroy the material to be processed, for example a cell culture, by possible overheating or undercooling.

In a preferred embodiment of the procedure, the plausibility condition is evaluated as not being met if a specified difference between the two temperature sensor signals is exceeded. The difference can also be adjusted as a function of the difference between the desired value and the actual value or the absolute value.

If the plausibility condition is not met, the feedback controller/monitoring device outputs an actuating signal to stabilize the temperature of the atmosphere of the useful space. In practice this means that the monitoring device interrupts the supply of energy for stabilizing the temperature of the atmosphere of the useful space.

It has proved to be especially advantageous to determine the temperature of the useful space by two separate measuring systems. The two separate measuring systems include two discrete temperature sensors. The two temperatures from the sensors, that is the values of the signals from the sensors which measure the temperature, are cyclically compared with one another. It also turns out to be advantageous for sensor signal values falling outside the specified plausibility band of the selected measurement and feedback control range to trigger a permanent shutdown with an error message.

If the plausibility condition for two sensor signals S1 and S2 is met, and the desired value W1 exceeds or falls below an adjustable tolerance band, the controller/monitoring device and the actuator which is connected therewith, takes over regulation as the primary feedback control circuit. If the measured temperature falls below the tolerance band and if the error time has run out, an error message is produced "Temperature below." By contrast, if the temperature is above the tolerance band, an error message "Temperature above" is produced. Temperature regulation is then taken over by a "material protection" program in a controller/monitoring device with a connected main power cut-off relay which represents an actuator.

It has turned out to be especially advantageous that if the upper tolerance band value is exceeded, the procedure can further regulate the system to the desired temperature value W1 which has been set via an all-pole main power cut-off relay.

The task is solved in a device to regulate the temperature of a material to be processed in a processing chamber with an atmosphere which can be closed off to the surroundings. The device includes at least a first and a second control circuit and each of their control inputs for an actual value signal being connected with a temperature sensor in the processing chamber. The first control circuit is connected with a first input of a comparison module and the second control circuit is connected with a second input of a comparison module. This is for the purpose of forming the difference between the actual temperature value signals and performing a plausibility test on the sensor signals. The plausibility test consists of whether the temperatures exceed a specified threshold difference value. The output of at least one controller is connected with a controllable actuator for stabilizing the temperature of the processing chamber atmosphere. Each output of the comparison module is connected with the input of a controller of the first control circuit and the input of a controller/monitoring device which serves as a controller of the second control circuit.

In one embodiment, a digital computer takes over the functions of the comparison module, controller, and monitoring device. The digital sensor is connected through a bus system with a main processor which represents part of the comparison module. The temperature sensor with a thin-film measuring shunt resistor and a downstream amplifier circuit has an analog-to-digital converter connected to it, which is also connected with the bus system. The signal output of the monitoring device is connected with a warning device and an actuator. The actuator can be controlled by a controller of the monitoring device.

It has turned out to be advantageous that a short in the device heating system (e.g., actuator permanently closed) can be unambiguously detected. If the measured temperature is plausible (i.e., the two temperature sensor signals are within the plausibility band) and an adjustable tolerance band value around the specified value is exceeded, then actuation of the heating system is taken over by a primary, all-pole switching contact unit. The unit represents an actuator, and a special software module in the controller/monitoring device. This makes it possible to regulate the temperature back down to this set desired value W1 and to continue to regulate it. Here the tolerance band serves as a trigger band to activate this function, which is called "material protection".

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
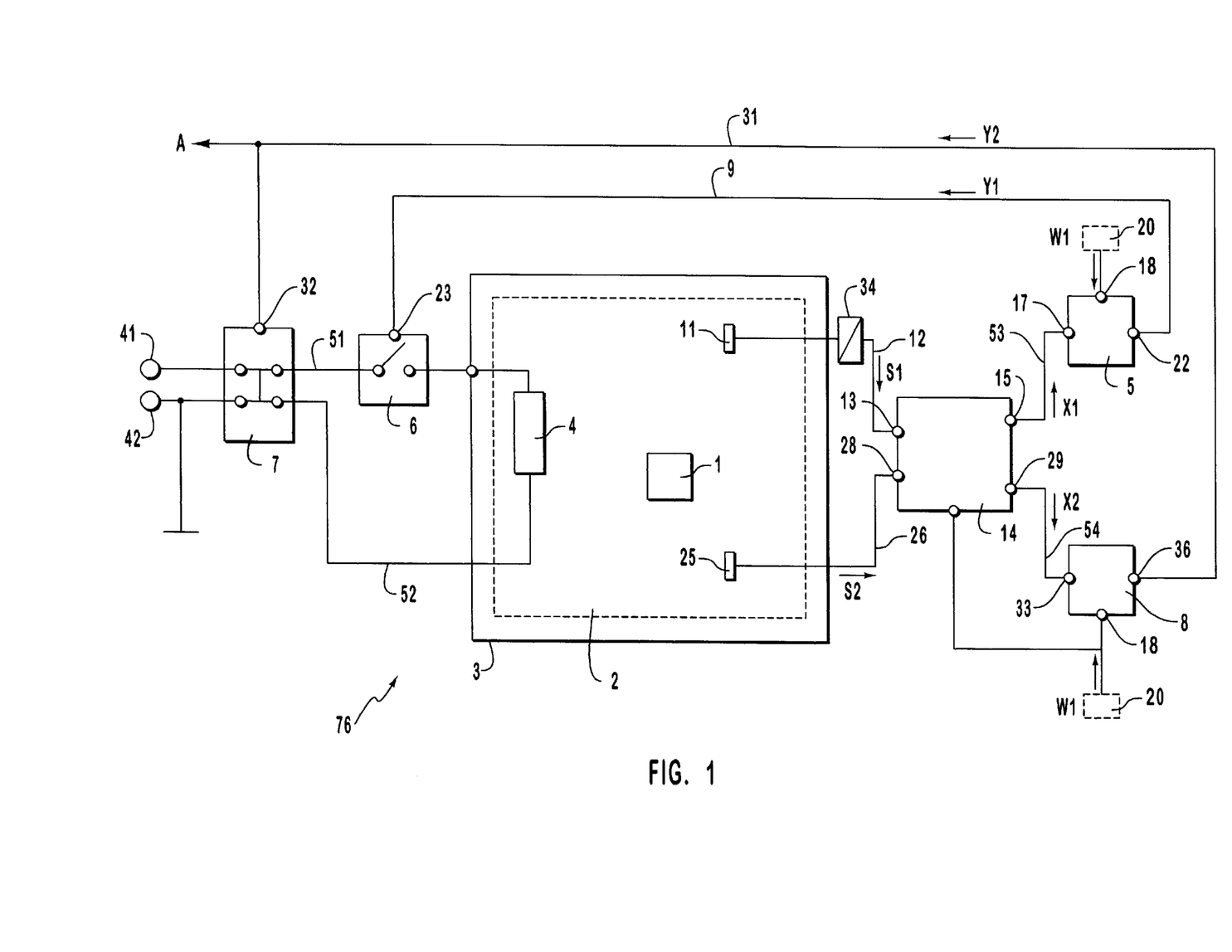
FIG. 1 shows a schematic representation of an incubator with its processing chamber and the associated peripherals such as the controller, temperature stabilization device, and monitoring device.

Depicted in FIG. 1 is a schematic representation of one embodiment of a system 76 incorporating features of the present invention. System 76 includes an incubator 3 bounding a process chamber 2. The apparatus structure of incubator 3 corresponds essentially to a common incubator device, such as, for example, disclosed in DE 29 24 446 or DE 33 15 085 C2. Removably disposed within chamber 2 for processing is a material 1. In one embodiment, material 1 is a cell culture. Also disposed within chamber 2 is a stabilization element 4 such as a heating element or cooling element. Stabilization element 4 is configured to produce and maintain a desired temperature within process chamber 2, thereby controlling and stabilizing the temperature of material 1. Stabilization element 4 is energized by supply lines 51 and 52 feeding into and out of stabilization element 4. Supply lines 51 and 52 terminate at terminals 41 and 42, respectively, where a power supply, not shown, is coupled.

Actuators 6 and 7, disposed along supply lines 51 and 52, selectively control the operation of stabilization element 4. The operation of actuator 6 is controlled by a controller module 5. Actuating signals Y1 from controller module 5 are transferred through a line 9 to actuator 6. Line 9 couples with controller module 5 through an output 22 and with actuator 6 through input 23. Controller module 5 and actuator 6 combine to form a first control circuit.

Also disposed within processing chamber 2 is a first temperature sensor 11. In one embodiment, first temperature sensor 11 comprises an electronic amplifier circuit and includes a measuring shunt resistor, such as a Pt 1000 platinum resistor. Temperature sensor 11 is connected to an analog-to-digital converter 34 which in turn is coupled through a line 12 with a first input 13 of a comparison module 14. The temperature measured in processing chamber 2 by temperature sensor 11 is transferred over line 12 to comparison module 14 in the form of a sensor signal S1.

Comparison module 14 has two outputs 15 and 29. A line 53 extends from output 15 to an input 17 on controller module 5. Line 53 transfers a signal X1 proportional to S1 from comparison module 14 to controller module 5. Simultaneously, controller module 5 is connected through a second input 18 with a primary detector 20. Primary detector 20 transmits a signal W1 which specifies a desired temperature. The value for the desired temperature can be constant over time or defined by a function which varies over time (temperature schedule).

Controller 5 determines the deviation between signals X1 and W1 as a function of time by forming the difference between the signals X1 and W1 applied to inputs 17 and 18. To adjust the established actual temperature X1 to the specified desired value W1 as quickly as possible, the actuating signal Y1 is fed through output 22 to input 23 of actuator 6, which controls temperature stabilization element 4.

In practice, the parameters of controller module 5 for the controlled system formed by temperature stabilization element 4 and processing chamber 2 with temperature sensor 11 are adapted by practical tests. This adaptation process strives to make the operation of controller module 5 and controlled system as stable as possible.

The present invention also includes a controller/monitoring device 8 with a controller function. The controller of controller/monitoring device 8 has a structure corresponding to that of controller module 5. Controller/monitoring device 8 controls the operation of actuator 7. Controller/monitoring device 8 and actuator 7 combine to form a second control circuit. Actuating signals Y2 from controller/monitoring device 8 are transferred through a line 31 to actuator 7. In one embodiment, the activation of actuator 7 causes a permanent all-pole disconnect. Line 31 couples with controller/monitoring device 8 through an output 36 and with actuator 7 through an input 32.

To monitor the control process, a second temperature sensor 25, which in one embodiment is digital made in the form of a semiconductor element, is also positioned within processing chamber 2. Second temperature sensor 25 is connected through a line 26 and input 28 to comparison module 14. The temperature measured in processing chamber 2 by second temperature sensor 25 is transferred over line 26 to comparison module 14 in the form of a sensor signal S2. In one embodiment, comparison module 14 is in the form of a digital computer having a central processing unit (CPU).

A line 54 extends from output 29 of comparison module 14 to an input 33 of controller/monitoring device 8. Line 54 transfers a signal X2 proportional to S2 from comparison module 14 to controller/monitoring device 8. As with controller module 5, controller/monitoring device 8 is also connected through a second input 18 with a primary detector 20. Primary detector 20 transmits the same signal W1 which specifies a desired temperature. The value for the desired temperature can be constant over time or defined by a function which varies over time (temperature schedule). In a preferred embodiment, the comparison module 14, the controller module, and the monitoring device are made as a program module of a digital computer.

During use, first temperature sensor 11 and verification second temperature sensor 25 continuously measure the temperature prevailing in processing chamber 2. Comparison module 14 determines, independently of the control circuit with controller 5, whether signal S2 from temperature sensor 25 applied at input 28 of comparison module 14 is still within an allowed temperature difference of signal S1 from first sensor 11 applied at input 13. The temperature difference is specified by a plausibility range hereafter designated as W3. Comparison module 14 also determines whether the temperature difference between the two temperature measurement signals S1 and S2 is so great that the feedback control circuit with controller module 5 needs to be deactivated and control assumed by controller/monitoring device 8.

More specifically, the temperature signal value S1 of first temperature sensor 11 has an error and plausibility band placed around it which is intended to form a time comparison range. This time comparison range is used to check that the reference input temperature sensor signal S1 of temperature sensor 11 and the verification temperature sensor signal S2 of second temperature sensor 25 behave or move in approximately the same direction over time. As soon as the difference between the two temperature sensor signal values S1 and S2 exceeds a specified plausibility value, a warning signal is triggered from comparison module 14 together with controller/monitoring device 8 through output 36. The warning signal can travel along line 31 to a location designated by "A" where an operator is warned or where some type of alarm such as an audible or visual alarm is activated. The warning signal can also be transmitted through other communications lines to remote locations. Simultaneously, a control signal Y2 is fed through line 31 to input 32 of actuator 7 to open the electrical contacts and cause a permanent all-pole disconnect of temperature stabilization element 4. A notable feature of the present invention is that the switch-over to control line 31 is accompanied by an actuation signal Y2 which sends a warning to the operator, which is symbolized by A.

Figure 2:
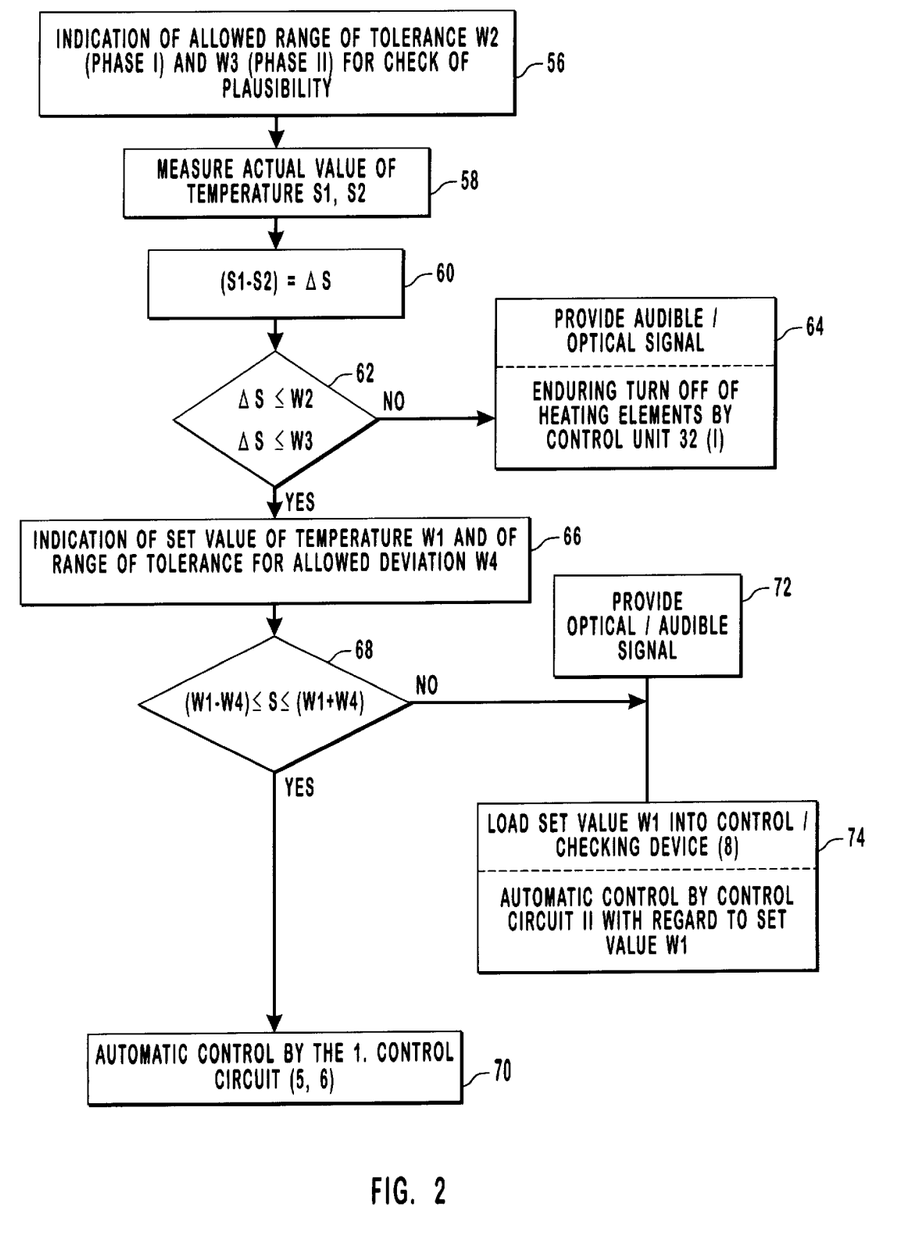
FIG. 2 is a flow chart which schematically shows the procedure's sequence of steps when various possible errors occur.

Depicted in FIG. 2 is a block flow diagram illustrating one method of operation of the inventive system. In block 56, plausibility tolerance bands W2 for a warm-up phase (I) and W3 for a subsequent incubation phase (II) are specified and feed into a CPU such as in comparison module 14. During normal operation, the difference between the two sensor signals S1 and S2 derived from processing chamber 2, or more specifically between their corresponding electrical signal values X1 and X2, should lie within tolerance bands W2 and W3.

In block 58, the actual temperature values S1 and S2 in processing chamber 2 are determined. The temperature values S1 and S2 are converted by comparison module 14 into corresponding electric signals X1 and X2. In block 60, a CPU calculates the difference between the temperature values, $|S1-S2|=\Delta S$. For simplicity, only the designations for the temperature values S1 and S2 will be mentioned below, rather than the signal values X1 and X2.

Decision block 62 next determines whether $\Delta S \leq W2$ in warm-up phase (I) and whether $\Delta S \leq W3$ in incubation phase (II). If the conditions of $\Delta S \leq W2$ in phase (I) and $\Delta S \leq W3$ in phase (II) are met, it can be assumed that temperature sensors 11 and 25 are operating and temperature values S1 and S2 are correct. If either of the conditions are not met, it must be assumed that one of the two actual temperature values S1, S2 is incorrect and thus that one of the two temperature sensors 11 and 25 is not working correctly. Since the system can not tell which temperature sensor is operating correctly, the correct temperature cannot be verified. Material 1 being processed is then protected by interrupting the energy supply for stabilization element 4 which controls the temperature of processing chamber 2, and an acoustic and/or optical warning signal is output as set forth in block 64. By interrupting the energy supply to stabilization element 4, the temperature within chamber 2 begins to fall.

Figure 3A:
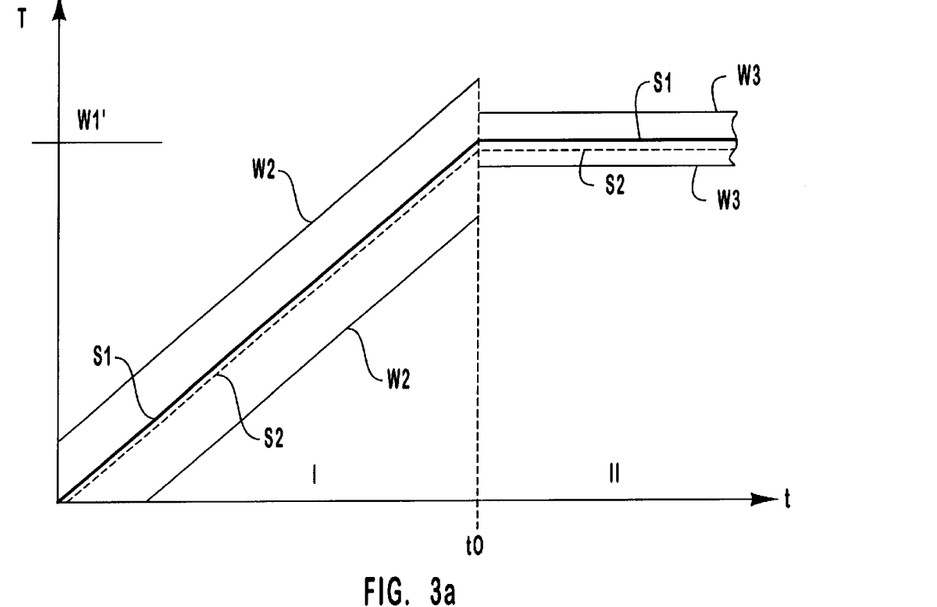
FIG. 3a shows a schematic plot of temperature over time for the reference input variable which remains within a tolerance band plausibility value, it being possible to narrow the tolerance band slightly after the desired value is reached; the time axis is indicated by t, and the temperature axis by T.

For example, FIG. 3a shows a plot of temperature (T) versus time (t) for temperature values S1 and S2 within processing chamber 2. The temperature values are plotted during both the phase I warm-up and the phase II incubation. The comparatively large mass of sensors 11 and 25 can cause substantial temperature fluctuations in the heating phase I. Accordingly, the plausibility check of the two temperature sensor signal values S1 and S2 should use a comparatively broad plausibility tolerance band W2. For example, in one embodiment, tolerance band W2 can be about ±5° C. around first temperature sensor signal value S1.

After a desired value W1' (for example, a desired temperature value corresponding to 37°) is reached, incubation phase II begins at time point t0 with a "tighter" (that is, narrower) plausibility tolerance band W3. For example, in one embodiment, tolerance band W3 can be about ±2° C. around first temperature sensor signal value S1. As a result, higher requirements are placed on the plausibility of the two temperature sensor signals S1 and S2. In the graph shown in FIG. 3a, temperature values S1 and S2 remain within band widths W2 and W3 during phases I and II. As such, it is assumed that temperature values S1 and S2 are correct.

Figure 3B:
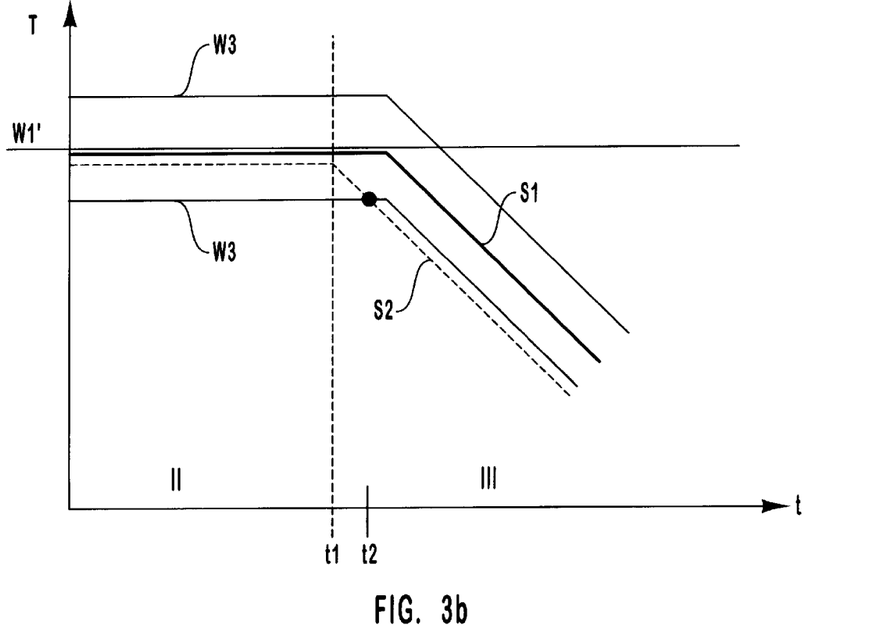
FIG. 3b shows an error condition in which the verification actual value S2 leaves the plausibility tolerance band, while the reference actual value S1 leaves the desired value set to 37° in the direction of a rise in temperature, which can be feigned, for example, by sensor drift. After the error condition occurs, the device cools off, so that both the reference input variable and the verification actual value undergo a drop in temperature over time.

FIG. 3b shows another curve during the incubation phase II (continuing the phase II shown in FIG. 3a). As shown therein, signal value S1 of temperature sensor 11 experiences drift (e.g. positive drift). This causes second temperature sensor signal S2 to leave the plausibility tolerance band W3. As a result, there is a plausibility check whether the temperature difference ΔS exceeds the tolerance band value W3. The two temperature sensor signal values S1 and S2 are no longer unambiguous. That is, at least one of the two temperature sensors 11, 25, or the associated peripherals are defective. In this case, controller/monitoring device 8 permanently disconnects temperature stabilization element 4 and cools the device's processing chamber 2, if temperature stabilization element 4 is a heating element.

More specifically, at time point t1, as shown in FIG. 3b, a positive drift beings in the value of the temperature sensor signal S1 which leads to a decrease in the temperature of processing chamber 2. Consequently, this causes the value of second temperature sensor signal S2 to leave tolerance band W3 by crossing the lower limit of the plausibility values. Comparison module 14 thus finds a lack of plausibility in the values of the two temperature signals S1 and S2.

Since the comparison system cannot determine which of the two temperature sensors 11 or 25 is supplying a false temperature sensor signal value, the so-called "error condition" is triggered at time point t2, and the supply of energy ceases to temperature stabilization element 4. In practice this means that actuator 7 causes an all-pole interrupt of the circuit of temperature stabilization element 4. Thus, if the prior process was heating (incubation phase), the two temperature sensor signal values S1 and S2 decline in Phase III (seen over time t) due to the error condition.

Returning to FIG. 2, if the conditions ΔS≦W2 (phase I) and ΔS≦W3 (phase II) are met, it can be assumed that the temperature measurements are correct. The desired temperature W1 and the allowable deviation W4 relative to W1 are then set in block 66. Decision block 68 then determines whether the actual temperature value S1 (and also the actual temperature value S2, if the plausibility condition is met) remains within the error tolerance band W4 lying between a lower limit (W1−W4) and an upper limit (W1+W4). If the conditions of block 68 are met, then the temperature of chamber 2 is automatically being correctly controlled by controller module 5 and actuator 6 as set forth in block 70.

However, if an error should occur in the first control circuit, for example due to a continued short circuit in the switch contact of the actuator 6, the temperature in the processing chamber would rise continuously until the temperature signal S1 (and also S2) exceeds the upper limit (W1+W4), and thus leaves the error tolerance band. In this case, the condition (W1−W4)≦S2≦(W1+W4) is no longer met. Under this condition, as shown in block 74, the desired value W1 is loaded into controller/monitoring device 8, and control of the temperature in processing chamber 2 is continued by the second control circuit, consisting of control/monitoring device 8 and actuator 7. In block 72, an optical or acoustic signal is simultaneously output to make the operator aware of the error situation in the first control circuit.

Figure 4:
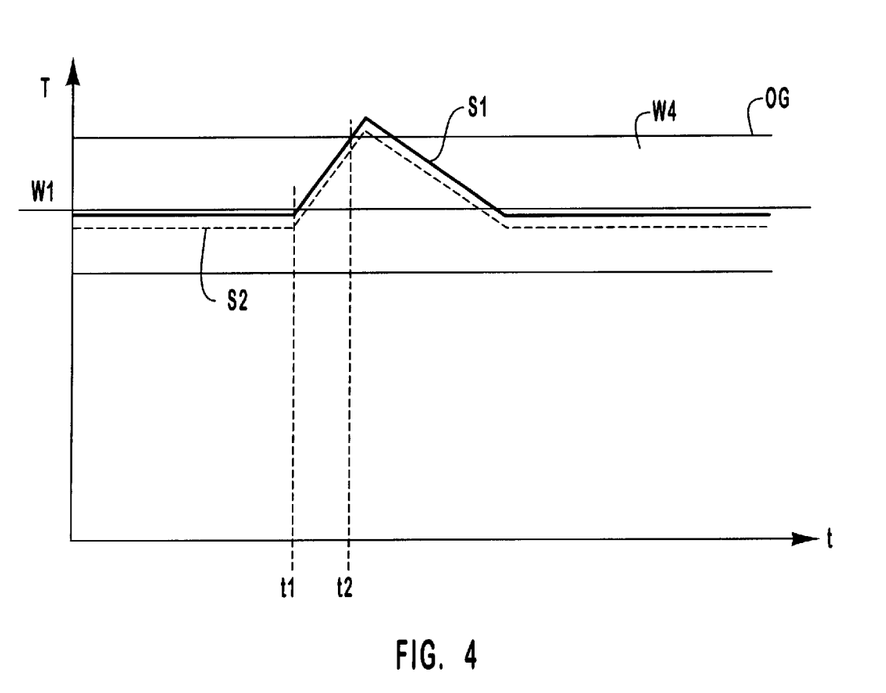
FIG. 4 shows an error condition in which the definable difference between the specified value and the actual value (the error tolerance band) is exceeded. The time axis is indicated by t, and the temperature axis by T.

FIG. 4 illustrates how the so-called "material protection" function can take effect if an error should occur in the feedback control circuit, for example, should a contact of actuator 6 as shown in FIG. 1 remains permanently closed. As long as the temperature signal value S1 as measured by temperature sensor 11 remains within freely definable error tolerance band W4 around the desired temperature W1 in comparison module 14, the controller/monitoring device 8 is not active with regard to stabilizing the temperature of the processing chamber. In contrast to what happens when a sensor error occurs (FIGS. 3a, 3b), the temperature sensor signal values S1 and S2 determined by temperature sensors are plausible. Starting from time point t1, however, a rise in both temperature sensor signal values S1 and S2 can be seen. When the temperature values exceed the limit of the error tolerance band W4 at time point t2, this immediately causes actuator 7 to perform an all-pole disconnect of temperature stabilization element 4. Furthermore, the regulation to set desired temperature W1 is assumed by controller/monitoring device 8 acting as a (digital) controller.

If actuator 6 is falsely triggered (its contacts remain constantly open), it is also possible to shut off actuator 6, so that the circuit between temperature stabilization element 4 and actuator 7 is closed.

As shown in FIG. 4, the occurrence of an error condition can be recognized in which an error in the feedback control circuit (with the exception of temperature sensors 11, 25) causes both established temperature sensor signals S1 and S2 leave the upper limit "OG" of the error tolerance band W4. The temperature signals turn back towards the mean W or W1 of the desired value signal after regulation begins at time t2. This means that either the controller or the actuator are experiencing an error. The actuator in this case analogously also including the temperature stabilization element 4.

The special advantage of this "protective circuit" is that if the controlled system should experience an error, it can be regulated back to the desired temperature W1 specified by the user, and is exposed to an excess temperature for only a short time until the "trigger threshold" OG is reached and the material to be processed cools back down.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. Procedure to regulate the temperature of a material to be processed in the atmosphere of a processing chamber which is closed to the surrounding atmosphere by comparing a desired temperature with the actual temperature in a first and in a second control circuit, according to which actual temperatures determined by at least two independent temperature sensors in the processing chamber undergo a plausibility test with a specified threshold difference value, with non-fulfillment of the plausibility condition causing a signal to be output and the energy supply for stabilizing the temperature of the processing chamber to be interrupted, characterized by the fact that when the plausibility condition is met and the temperature of the processing chamber rises above or falls below an adjustable tolerance band (W4) about a specified desired temperature (W1), control is passed from the first control circuit to the second control circuit with a controller/monitoring device (8) and its own independent actuator (7).

2. Procedure according to claim 1, characterized by the fact that the controller/monitoring device (8) takes over and readjusts the desired temperature (W1) from the first controller.

3. Procedure according to claim 1, characterized by the fact that the controller/monitoring device (8) regulates the temperature in the useful space, this regulation being independent from the first control circuit.

4. Procedure according to claims 1, characterized by the fact that if the plausibility condition is not met the controller/monitoring device outputs an error signal.

5. A procedure to regulate the temperature of a processing chamber, the procedure comprising the steps of:
   (a) obtaining repeatedly a first temperature from a first sensor disposed within the processing chamber and a second temperature from a second sensor disposed within the processing chamber;
   (b) comparing repeatedly the first temperature and the second temperature with a desired temperature range;
   (c) controlling the temperature of the processing chamber through a first control circuit as long as the first temperature and second temperature continuously remains within the desired temperature range; and
   (d) controlling the temperature of the processing chamber through a second control circuit after the first temperature or second temperature extends out of the desired temperature range.

6. A procedure as recited in claim 5, wherein a warning is automatically produced when the first temperature first extends out of the desired temperature range.

7. A procedure as recited in claim 5, wherein the step of controlling the temperature of the processing chamber through a first control circuit comprises transmitting a signal through a controller to a first actuator, the first actuator facilitating operation of a stabilization element disposed within the processing chamber.

8. A procedure as recited in claim 5, wherein the step of controlling the temperature of the processing chamber through a second control circuit comprises transmitting a signal through a controller/monitoring device to a second actuator, the second actuator facilitating operation of a stabilization element disposed within the processing chamber.

9. Device for regulating the temperature of a material to be processed in a processing chamber with an atmosphere which can be closed off to the surroundings, comprising at least a first and a second control circuit, each of whose inputs for an actual value signal is connected with an independent temperature sensor in the processing chamber, a first one of which is connected with a first input and a second (25) one of which is connected with a second input of a comparison module for the purpose of forming the difference between the actual signals and subsequently performing a plausibility test on the sensor signals, which consists of whether their difference exceeds a specified threshold value, and the output of at least one controller is connected with a controllable actuator for stabilizing the temperature of the processing chamber atmosphere, each output of the comparison module (14) connected with the input (17) of a controller (5) of the first control circuit and with the input of a controller/monitoring device (8), which serves as the controller of the second control circuit.

10. Device according to one of claim 9, wherein the function of the comparison module (14), controller (5), and controller/monitoring device (8) is carried out by the programming of a digital computer.

11. Device according to claim 9, wherein one of the two temperature sensors (8) is made as a thin-film measuring shunt resistor and the other (15) as a digital sensor based on a semiconductor.

12. Device according to one of claim 9, wherein both the digital sensor (15) and an a/d converter (34), which is downstream of the temperature sensor (8) with a thin-film measuring shunt resistor and an amplifier circuit, are connected through a bus system with a main processor representing a part of the comparison module (14).

13. Device according to one of claim 9, wherein the signal output of the controller/monitoring device (8) is connected with a warning device and an actuator.

14. Device according to claim 9, wherein the actuator can be controlled by a controller of the controller/monitoring device (8).

15. Device according to claim 9, wherein all poles of the actuator of the controller/monitoring device (8) can be switched.

16. A system comprising:
   (a) a housing bounding a processing chamber;
   (b) a stabilization element associated with the processing chamber so as to control the temperature of the processing chamber;
   (c) a first temperature sensor and a second temperature sensor disposed within the processing chamber;
   (d) a CPU configured to continually monitor the temperature of the first temperature sensor and the second temperature sensor and to compare a select temperature chosen from the temperature of the first temperature sensor and the second temperature sensor with a desired temperature range;
   (e) a first control circuit electrically coupled with the CPU and the stabilization element, the first control circuit being configured to control the operation of the stabilization element as long as the select temperature continuously remains within the desired temperature range, the first control circuit comprising a controller module and a first actuator, the controller module being coupled with the CPU to receive a temperature signal corresponding the temperature of the first temperature sensor; and
   (f) a second control circuit electrically coupled with the CPU and the stabilization element, the second control circuit being configured to control the operation of the stabilization element after the select temperature extends out of the desired temperature range.

17. A system as recited in claim 16, wherein the second control circuit comprises a controller/monitoring device and a second actuator, the controller/monitoring device being coupled with the CPU to receive a temperature signal corresponding to temperature from the second sensor.

18. A system as recited in claim 16, wherein one of the temperature sensors is made as a thin-film measuring shunt resistor and the other as a digital sensor based on a semiconductor.

19. A system comprising:
(a) a housing bounding a processing chamber;
(b) a stabilization element associated with the processing chamber so as to control the temperature of the processing chamber;
(c) a first temperature sensor and a second temperature sensor disposed within the processing chamber;
(d) a CPU configured to continually monitor the temperature of the first temperature sensor and the second temperature sensor and to compare a select temperature chosen from the temperature of the first temperature sensor and the second temperature sensor with a desired temperature range;
(e) a first control circuit electrically coupled with the CPU and the stabilization element, the first control circuit being configured to control the operation of the stabilization element as long as the select temperature continuously remains within the desired temperature range; and
(f) a second control circuit electrically coupled with the CPU and the stabilization element, the second control circuit being configured to control the operation of the stabilization element after the select temperature extends out of the desired temperature range, the second control circuit comprising a controller/monitoring device and an actuator, the controller/monitoring device being coupled with the CPU to receive a temperature signal corresponding to the temperature of the second sensor.

20. A system as recited in claim 19, wherein the second actuator is configured to produce an all-pole disconnect of the stabilization element.

21. A system as recited in claim 19, wherein the controller/monitoring device is electrically coupled with a warning device.

22. A system as recited in claim 19, wherein the CPU is configured to repeatedly compare the temperature of the first temperature sensor and the temperature of the second temperature sensor with the desired temperature range.

23. A system comprising:
(a) a housing bounding at processing chamber;
(b) a stabilization element associated with the processing chamber so as to control the temperature of the processing chamber;
(c) a first temperature sensor and a second temperature sensor disposed within the processing chamber;
(d) a CPU electrically coupled with the first temperature sensor and the second temperature sensor, the CPU being configured to continually determine a temperature difference between the temperature of the first temperature sensor and the second temperature sensor and to determine whether the temperature difference is outside of a plausibility tolerance band;
(e) a first control circuit electrically coupled with the CPU and the stabilization element, the first control circuit comprising a controller module and a first actuator, the controller module being coupled with the CPU to receive a temperature signal corresponding to temperature from the first sensor; and
(f) a second control circuit electrically coupled with the CPU and the stabilization element.

24. A system as recited in claim 23, wherein the CPU is configured to turn off the stabilization element when the temperature difference falls outside of the plausibility tolerance band.

* * * * *

UNITED STATES PATENT AND TRADEMARK OFFICE
CERTIFICATE OF CORRECTION

PATENT NO.    : 6,173,903 B1

DATED         : January 16, 2001

INVENTOR(S)   : Helmut Loscher, Hubert Heeg

It is certified that error appears in the above-identified patent and that said Letters Patent is hereby corrected as shown below:

Title page,
References, change "82 29 723 U" to -- 82 29 723.1 --; and change "2 045 978" to -- 2 045 978 A --
ABSTRACT, line 6, after "difference.", change "if" to -- If --

Column 2,
Line 65, after "produced" insert a comma

Column 7,
Line 44, change "beings" to -- begins --

Column 8,
Line 24, change "remains" to -- remain --
Line 49, before "leave" insert -- to --
Line 54, after "case" insert -- also --
Line 55, delete [also]; and change "including" to -- includes --

Column 9,
Line 31, change "claims" to -- claim --
Line 45, change "remains" to -- remain --

Column 10,
Line 14, before "connected" insert -- being --

UNITED STATES PATENT AND TRADEMARK OFFICE
CERTIFICATE OF CORRECTION

PATENT NO. : 6,173,903 B1
DATED : January 16, 2001
INVENTOR(S) : Helmut Loscher, Hubert Heeg It is certified that error appears in the above-identified patent and that said Letters Patent is hereby corrected as shown below:

<u>Column 12,</u>
Line 13, change "at" to -- a --

Signed and Sealed this

Twenty-sixth Day of February, 2002

Attest:

Attesting Officer

JAMES E. ROGAN
Director of the United States Patent and Trademark Office